(12) United States Patent
Brandenburg et al.

(10) Patent No.: US 7,962,437 B2
(45) Date of Patent: Jun. 14, 2011

(54) DATA COMPARISON USING DIFFERENT TIME PERIODS IN DATA SEQUENCES

(75) Inventors: Brian Brandenburg, Wake Forest, NC (US); Randall A. Craig, Raleigh, NC (US); Virginia D. Hill, Raleigh, NC (US); Govindaraj Sampathkumar, Cary, NC (US); Deanna M. Shaw, San Martin, CA (US)

(73) Assignee: International Business Machines Corporation, Armonk, NY (US)

( * ) Notice: Subject to any disclaimer, the term of this patent is extended or adjusted under 35 U.S.C. 154(b) by 782 days.

(21) Appl. No.: 11/941,214

(22) Filed: Nov. 16, 2007

(65) Prior Publication Data

US 2009/0132457 A1  May 21, 2009

(51) Int. Cl.
*G06F 15/18* (2006.01)
*G06F 17/30* (2006.01)
*G06N 3/08* (2006.01)

(52) U.S. Cl. .............. 706/48; 706/18; 706/20; 707/723; 707/725; 707/737

(58) Field of Classification Search ...................... 706/48
See application file for complete search history.

(56) References Cited

U.S. PATENT DOCUMENTS 6,754,388 B1   6/2004  Foslien et al.

OTHER PUBLICATIONS

Haigh et al., Visual Query Language: Finding patterns in and relationships among time series data, Seventh Workshop on Mining Scientific and Engineering Datasets, Apr. 24, 2004.*
Haigh et al., "Visual Query Language: Finding patterns in and relationships among time series data," Seventh Workshop on Mining Scientific and Engineering Datasets, Apr. 24, 2004, Lake Buena Vista, Florida, 8 pages.
Hochheiser et al., "Visual Specification of Queries for Finding Patterns in Time-Series Data," Visual Specification of Queries, Apr. 10, 2001, pp. 1-17.
Keogh et al., "An Augmented Visual Query Mechanism for Finding Patterns in Time Series Data," In the 5th International Conference on Flexible Query Answering Systems, 2002, 11 pages.

* cited by examiner

*Primary Examiner* — Donald Sparks
*Assistant Examiner* — Nathan H Brown, Jr.
(74) *Attorney, Agent, or Firm* — Lee Law, PLLC; Christopher B. Lee

(57) ABSTRACT

Data for a first time period in a primary data sequence is compared with data for a second time period in each of a set of secondary data sequences. The durations of the first and second time periods are correlated, and the first time period is different from the second time period. A ranking is assigned to each secondary data sequence based on the corresponding data for the second time period. The ranking for each of the set of secondary data sequences is written to a computer useable medium. The primary data sequence and the set of secondary data sequences are adjusted based on a request to change the primary data sequence to one of the set of secondary data sequences. The comparing, assigning, and writing are repeated for the adjusted primary data sequence and set of secondary data sequences.

18 Claims, 7 Drawing Sheets

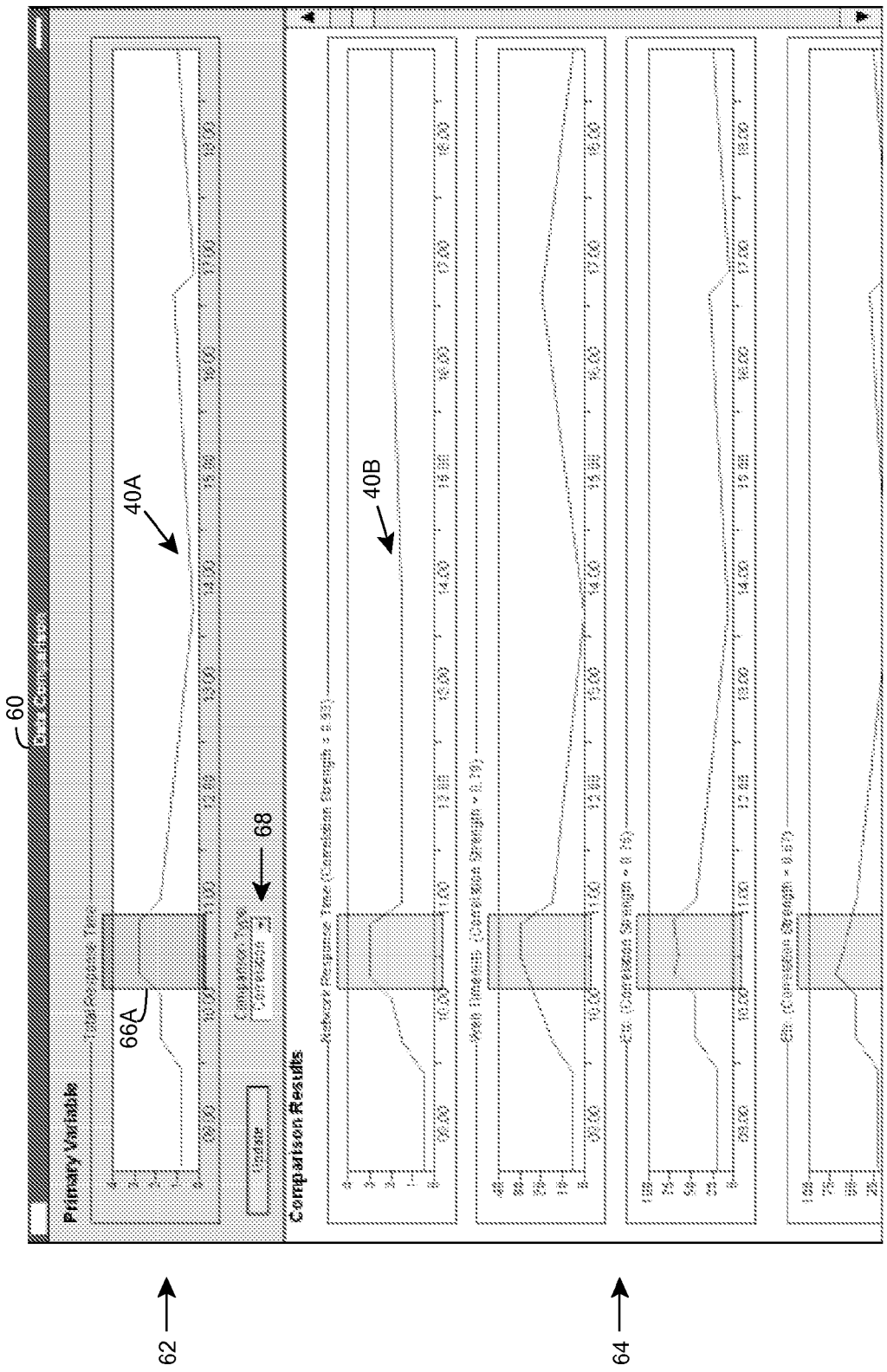

DATA COMPARISON USING DIFFERENT TIME PERIODS IN DATA SEQUENCES

TECHNICAL FIELD

The disclosure relates generally to analyzing data, and more particularly, to a solution for comparing data sequences.

BACKGROUND

In data analysis, it is often desirable to identify trends in time series data. For example, automated monitoring of network performance may generate time series data for a large number of monitored variables. When an anomaly is identified for one of the monitored network performance variables and/or resulting time series data, an information technology (IT) specialist may want to identify what else occurred at the same time for other variables/time series data. By looking at the data for the other variables/time series data, the IT specialist may be able to identify the root cause of the anomaly.

In current approaches, the IT specialist can view time series charts for multiple variables/time series data and manually determine whether any correlation may be present between two or more of the charts. However, particularly when a large number of variables are monitored, such an approach is cumbersome and subject to human error. Other approaches enable a user to designate a monitored time period to be analyzed, and a computer will analyze the same time period for other variables to determine if a similar anomaly was present. The computer can present a list of the variables/time period charts that exhibit a similar or correlated anomaly.

BRIEF SUMMARY

Aspects of the invention provide a solution in which data for a first time period in a primary data sequence is compared with data for a second time period in each of a set of secondary data sequences. The durations of the first and second time periods are correlated, and the first time period is different from the second time period. To this extent, the data in the primary data sequence during the first time period provides a template for assigning a ranking to each secondary data sequence based on the corresponding data for the second time period. The ranking(s) can be written to a computer useable medium, and used in displaying at least a portion of the primary data sequence and one or more of the secondary data sequence(s) for comparison. In this manner, a user can quickly identify and compare data sequences for determining sequentially correlated data patterns, which can facilitate further analysis, such as cause and effect analysis and/or the like.

A first aspect of the invention provides a method comprising: comparing data for a first time period in a primary data sequence with data for a second time period in each of a set of secondary data sequences, wherein the durations of the first and second time periods are correlated, and wherein the first time period is different from the second time period; assigning a ranking to each of the set of secondary data sequences based on the comparing; writing the ranking for each of the set of secondary data sequences to a computer useable medium; adjusting the primary data sequence and the set of secondary data sequences based on a request to change the primary data sequence to one of the set of secondary data sequences; and repeating the comparing, assigning, and writing for the adjusted primary data sequence and set of secondary data sequences.

A second aspect of the invention provides a system comprising: a memory; and a processor programmed to: compare data for a first time period in a primary data sequence with data for a second time period in each of a set of secondary data sequences, wherein the durations of the first and second time periods are correlated, and wherein the first time period is different from the second time period; assign a ranking to each of the set of secondary data sequences based on the comparing; write the ranking for each of the set of secondary data sequences to the memory; adjust the primary data sequence and the set of secondary data sequences based on a request to change the primary data sequence to one of the set of secondary data sequences; and repeat the comparing, assigning, and writing for the adjusted primary data sequence and set of secondary data sequences.

A third aspect of the invention provides a computer program comprising program code stored on a computer-readable storage medium, that makes a computer system operable to implement a method, the method comprising: comparing data for a first time period in a primary data sequence with data for a second time period in each of a set of secondary data sequences, wherein the durations of the first and second time periods are correlated, and wherein the first time period is different from the second time period; assigning a ranking to each of the set of secondary data sequences based on the comparing; writing the ranking for each of the set of secondary data sequences to a computer useable medium; adjusting the primary data sequence and the set of secondary data sequences based on a request to change the primary data sequence to one of the set of secondary data sequences; and repeating the comparing, assigning, and writing for the adjusted primary data sequence and set of secondary data sequences.

A fourth aspect of the invention provides a method of providing services, the method comprising: managing a computer system operable to: compare data for a first time period in a primary data sequence with data for a second time period in each of a set of secondary data sequences, wherein the durations of the first and second time periods are correlated, and wherein the first time period is different from the second time period; assign a ranking to each of the set of secondary data sequences based on the comparing; write the ranking for each of the set of secondary data sequences to a computer useable medium; adjust the primary data sequence and the set of secondary data sequences based on a request to change the primary data sequence to one of the set of secondary data sequences; and repeat the comparing, assigning, and writing for the adjusted primary data sequence and set of secondary data sequences.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIG. 4 shows an illustrative user interface for comparing data according to an embodiment.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION

As indicated above, aspects of the invention provide a solution in which data for a first time period in a primary data sequence is compared with data for a second time period in each of a set of secondary data sequences. The durations of the first and second time periods are correlated, and the first time period is different from the second time period. To this extent, the data in the primary data sequence during the first time period provides a template for assigning a ranking to each secondary data sequence based on the corresponding data for the second time period. The ranking(s) can be written to a computer useable medium, and used in displaying at least a portion of the primary data sequence and one or more of the secondary data sequence(s) for comparison. In this manner, a user can quickly identify and compare data sequences for determining sequentially correlated data patterns, which can facilitate further analysis, such as cause and effect analysis and/or the like. As used herein, unless otherwise noted, the term "set" means one or more (i.e., at least one) and the phrase "any solution" means any now known or later developed solution.

Figure 1:
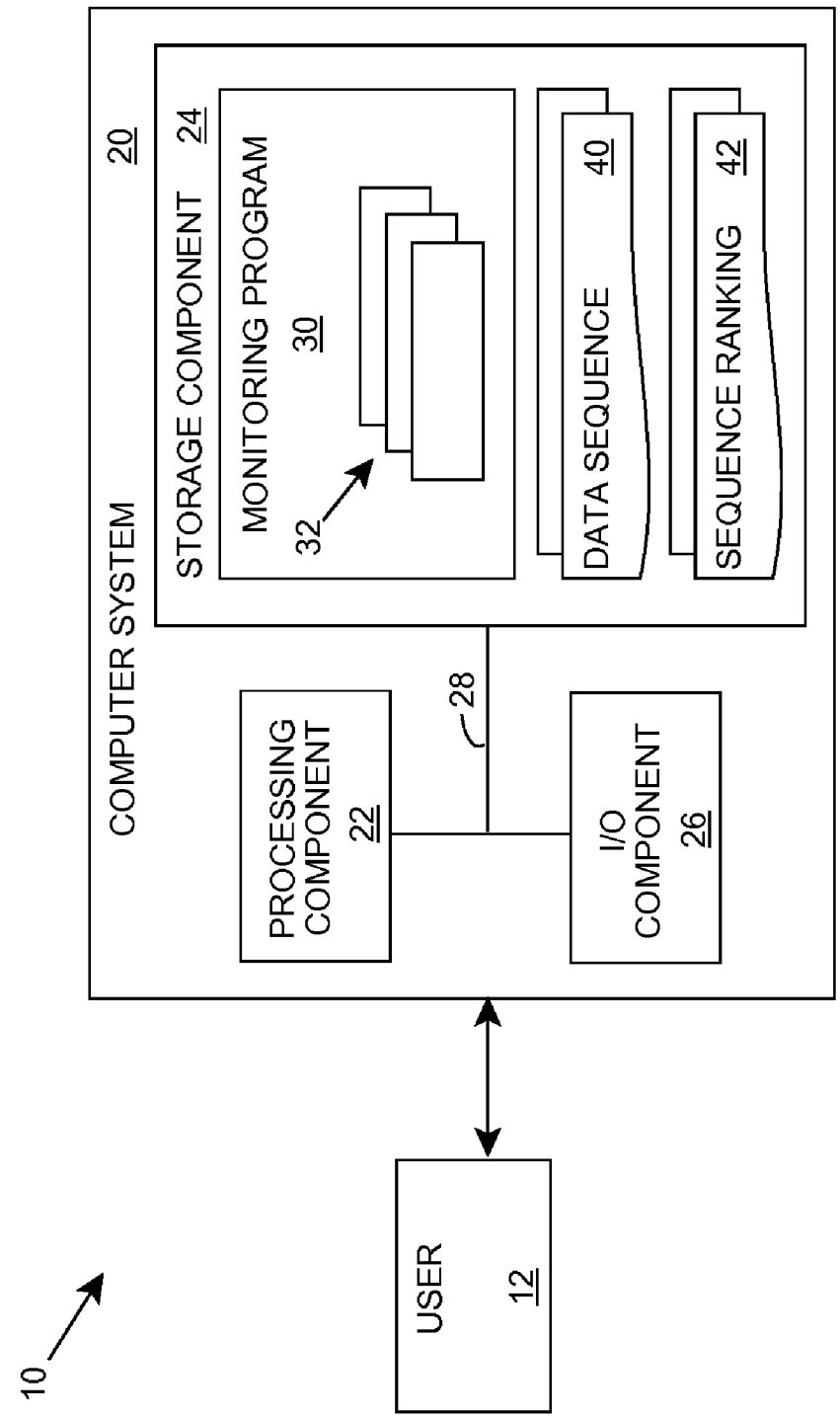
FIG. 1 shows an illustrative environment for comparing data according to an embodiment.

Turning to the drawings, FIG. 1 shows an illustrative environment 10 for comparing data according to an embodiment. To this extent, environment 10 includes a computer system 20 that can perform a process described herein in order to compare data. In particular, computer system 20 is shown including a monitoring program 30, which makes computer system 20 operable to compare data by performing a process described herein.

Computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, processing component 22 executes program code, such as monitoring program 30, which is at least partially stored in storage component 24. While executing program code, processing component 22 can read and/or write data from/to storage component 24 and/or I/O component 26. Computer system 20 can manage the data using any combination of one or more types of data structures. Pathway 28 provides a communications link between each of the components in computer system 20 using any solution. I/O component 26 can comprise one or more human I/O devices, which enable a human user 12 to interact with computer system 20 and/or one or more communications devices to enable a system user 12 to communicate with computer system 20 using any type of communications link.

In any event, computer system 20 can comprise one or more general purpose computing articles of manufacture (e.g., computing devices) capable of executing program code installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, monitoring program 30 can be embodied as any combination of system software and/or application software. Further, monitoring program 30 can be actually or conceptually implemented using a set of modules 32. In particular, each module can perform a set of actions used in a process implemented by monitoring program 30, and can be separately developed and/or implemented from other portions of monitoring program 30. When embodied in a tangible medium of expression, each module comprises a component that enables computer system 20 to perform the corresponding set of actions. Further, it is understood that some of the functionality discussed herein may not be implemented or additional functionality may be included as part of computer system 20.

However, it is understood that computer system 20 and monitoring program 30 are only representative of various possible equivalent computer systems that may perform a process described herein. To this extent, in other embodiments, the functionality provided by computer system 20 and monitoring program 30 can be at least partially implemented by a system that includes one or more computing devices, each of which includes any combination of general and/or specific purpose hardware with or without program code. In each embodiment, the hardware and program code, if included, can be created using standard engineering and programming techniques, respectively.

Regardless, when computer system 20 comprises multiple computing devices, each computing device can implement only a portion of the process, for example, by having only a portion (e.g., one or more modules 32) of monitoring program 30 installed thereon. Further, the computing devices can communicate over any type of communications link. Still further, while performing a process described herein, computer system 20 can communicate with one or more other computer systems using any type of communications link. In either case, the communications link can: comprise any combination of various types of wired, optical fiber, wireless, and/or the like, communications links; comprise any combination of one or more types of networks; and/or utilize any combination of various types of transmission techniques and protocols.

As discussed herein, monitoring program 30 makes computer system 20 operable to compare data in multiple data sequences 40. In an embodiment, each data sequence 40 comprises series data, which includes a sequence of data points measured at various intervals over a given expanse. For example, data sequence 40 can comprise time series data, which includes periodic measurements of a specified variable over a period of time. To this extent, monitoring program 30 can be utilized in any of various applications in which it may be desirable to compare data for multiple data sequences 40. For example, monitoring program 30 can be utilized to compare data sequences 40 of economic/financial data, meteorological data, process control data, medical/biological data, agricultural data, and/or the like. In an illustrative application described herein, monitoring program 30 compares data in data sequences 40 that include time series data for various network performance-related variables. However, it is understood that such a network monitoring application is only illustrative of the various applications and variables in which monitoring program 30 can be utilized.

Figure 2:
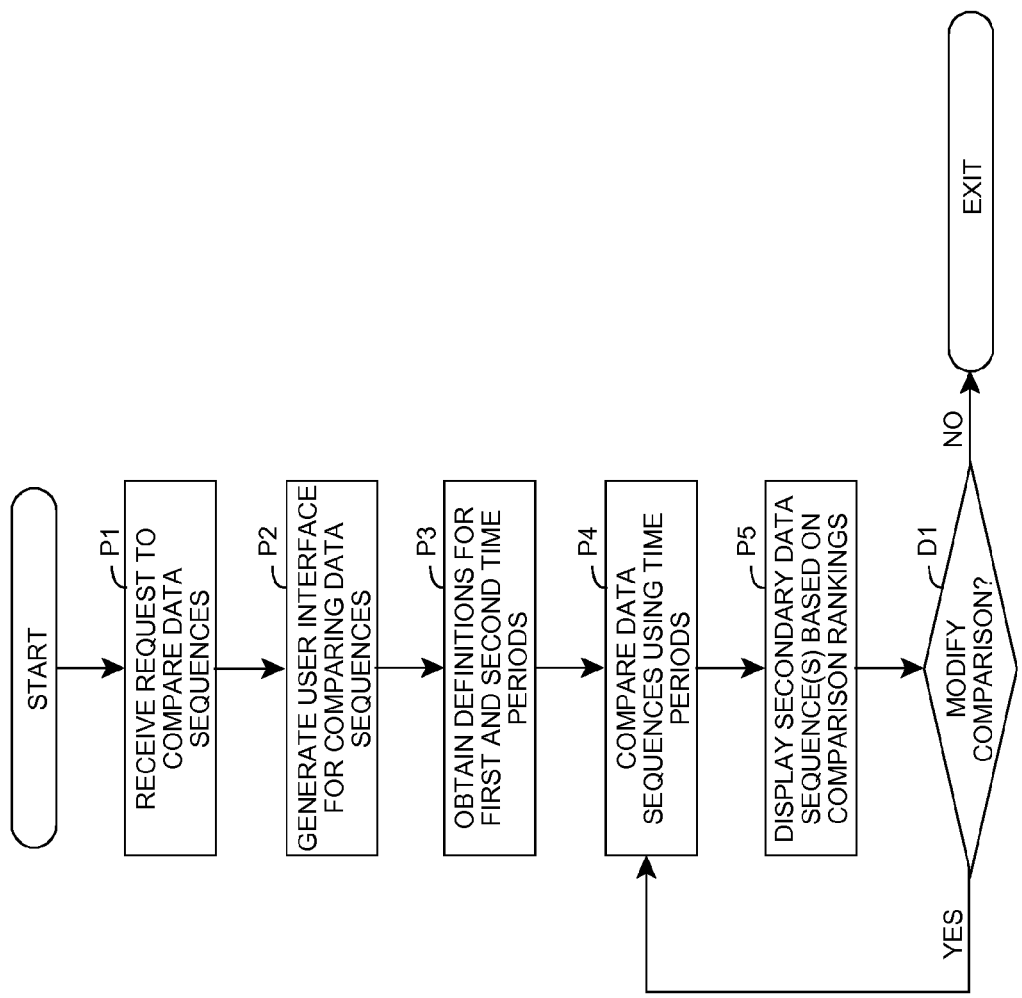
FIG. 2 shows an illustrative process flow according to an embodiment.
Figure 3:
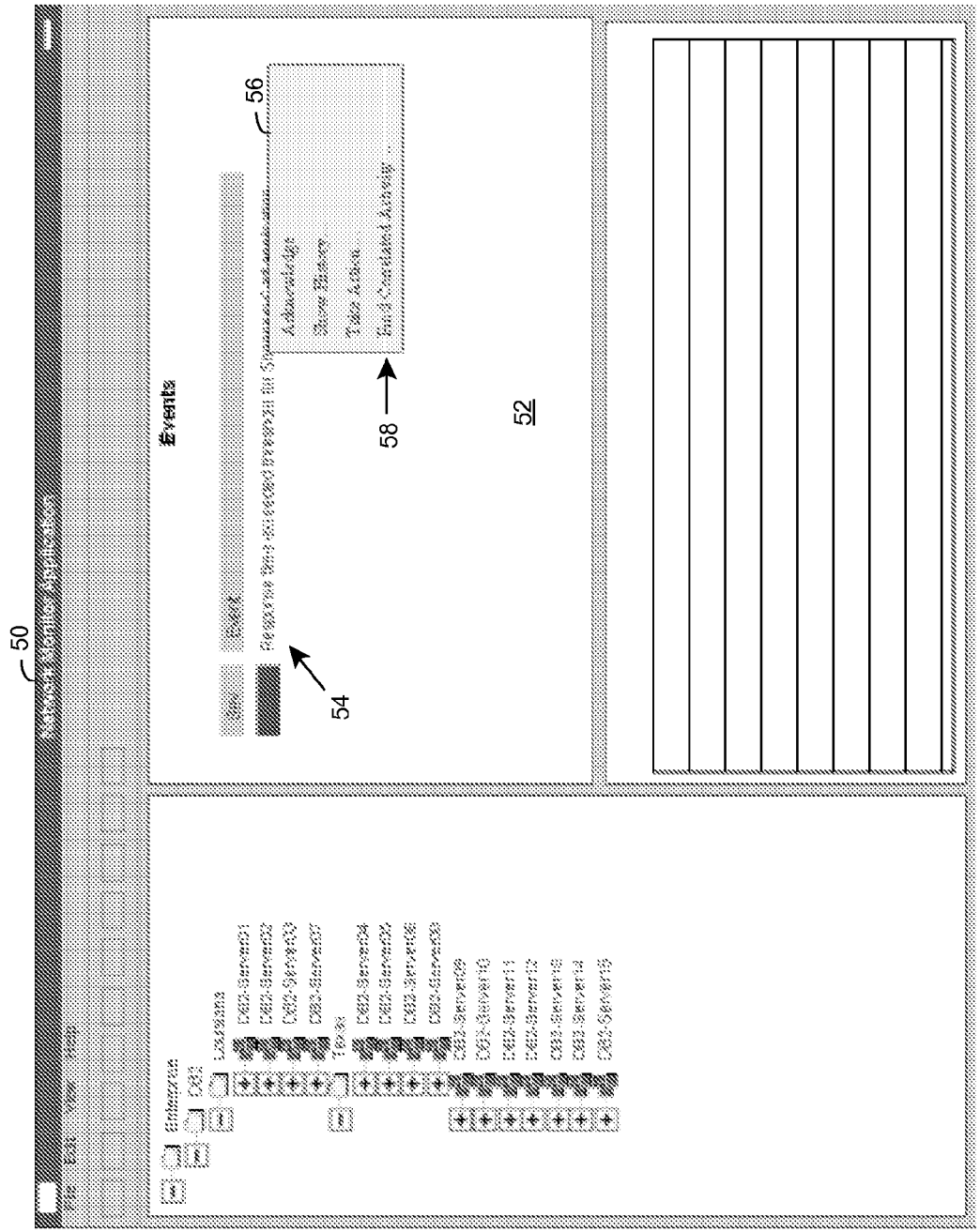
FIG. 3 shows an illustrative user interface for monitoring an network according to an embodiment.

FIG. 2 shows an illustrative process flow, which can be implemented by computer system 20 (FIG. 1), according to an embodiment. Referring to FIGS. 1 and 2, in process P1, computer system 20 receives a request to compare two or more data sequences 40. In an illustrative embodiment, computer system 20 manages a user interface for monitoring various performance-related variables in a network, which enables user 12 to generate the request. To this extent, FIG. 3 shows an illustrative user interface 50 for monitoring a network, which can be managed by computer system 20 (FIG. 1), according to an embodiment. User interface 50 includes a display portion 52 that displays various events that may occur in the network. An event can comprise, for example, the value of one or more variables going outside of an expected/typical range of values for the variable. Each event can be defined automatically, manually, or semi-automatically using any solution. Upon occurrence of an event, computer system 20 can display an event entry 54 in display portion 52, which describes the event.

In response to an event, user 12 (FIG. 1) can select one or more actions to take. For example, popup window 56 can enable user 12 to select a desired action. Popup window 56 can include an entry 58, which requests that computer system 20 find other activities that are correlated with the occurrence of the event. After selection of entry 58 by user 12, computer system 20 can generate an evaluation request. The evaluation request can include an identification of a primary data sequence to be evaluated. For example, the identification can identify the variable (e.g., "total response time") for which the event occurred, a time/time frame during which the event started/occurred, and/or the like. In response to the evaluation request, the primary data sequence can be compared with data sequence(s) for other variable(s).

In many applications, computer system 20 may be simultaneously monitoring numerous (e.g., hundreds, if not thousands) variables. Additionally, a variable may have known correlations with other variables and/or be known to be unrelated to other variables. To this extent, computer system 20 can define a set of data sequences that will be compared with the primary data sequence based on a larger group of data sequences. For example, the evaluation request can further include an identification attribute, which identifies a subset of an entire group of monitored variables/data sequences with which to compare to the primary data sequence. The identification attribute can identify a set of related variables/data sequences within a larger group of variables/data sequences using any solution (e.g., a flag indicating that all are network-related variables).

Returning to FIGS. 1 and 2, in process P2, computer system 20 can generate and further manage a user interface for comparing data sequences 40. For example, FIG. 4 shows an illustrative user interface 60 for comparing data, which can be managed by computer system 20, according to an embodiment. User interface 60 includes a primary display portion 62 and a comparison portion 62. Primary display portion 62 can display a graphical representation of at least a portion of the data sequence for the primary data sequence. By default, computer system 20 can include the portion of the data sequence during which the event occurred/started. Further, computer system 20 can use a default total period of time within the data sequence to display, a default location of the event period/start within the portion of the data sequence displayed, and/or the like. Regardless, computer system 20 and/or user 12 (FIG. 1) can selectively change the portion of the primary data sequence that is displayed (e.g., scroll left/right, reduce/increase time period, etc.) using any solution.

As discussed herein, user interface 60 enables user 12 to compare a primary data sequence 40A with one or more secondary data sequences, such as data sequence 40B. In particular, user 12 can define a time period during which to compare the data sequences 40. For example, computer system 20 can display a time period indicator 66A adjacent to the primary data sequence 40A. User 12 can adjust a location of time period indicator 66A, a width of time period indicator 66A, and/or the like to graphically define the time period. It is understood that time period indicator and the use of a similar graphical indicator, are only illustrative. To this extent, user 12 can define the time period using any solution.

After the time period has been defined, computer system 20 can compare the primary data sequence 40A with each secondary data sequence 40B. User 12 can define and computer system 20 can implement any type of comparison using any solution. To this extent, primary display portion 62 is shown including a user interface control 68, which enables user 12 to select a desired type of comparison (e.g., linear/curvilinear/inverse correlations, pattern matching techniques, percent change, standard deviation, and/or the like). Computer system 20 can utilize the designated type of comparison and time period 66A to perform the comparison and assign a sequence ranking 42 to each of the set of secondary data sequences 40B based on the comparison. For example, sequence ranking 42 can comprise and/or be based on a correlation strength that is calculated using the comparison. In an embodiment, computer system 20 can perform multiple types of comparison, and assign a sequence ranking 42 to each secondary data sequence 40B based on the highest result (e.g., highest correlation strength) for the different types of comparisons. Subsequently, computer system 20 can select at least one of the secondary data sequence(s) 40B based on the ranking(s) 42, and include a graphical representation of at least a portion of the selected secondary data sequence(s) 40B in display area 64. For example, computer system 20 can display one or more secondary data sequences 40B from the highest to lowest sequence rankings 42.

Figure 5A:
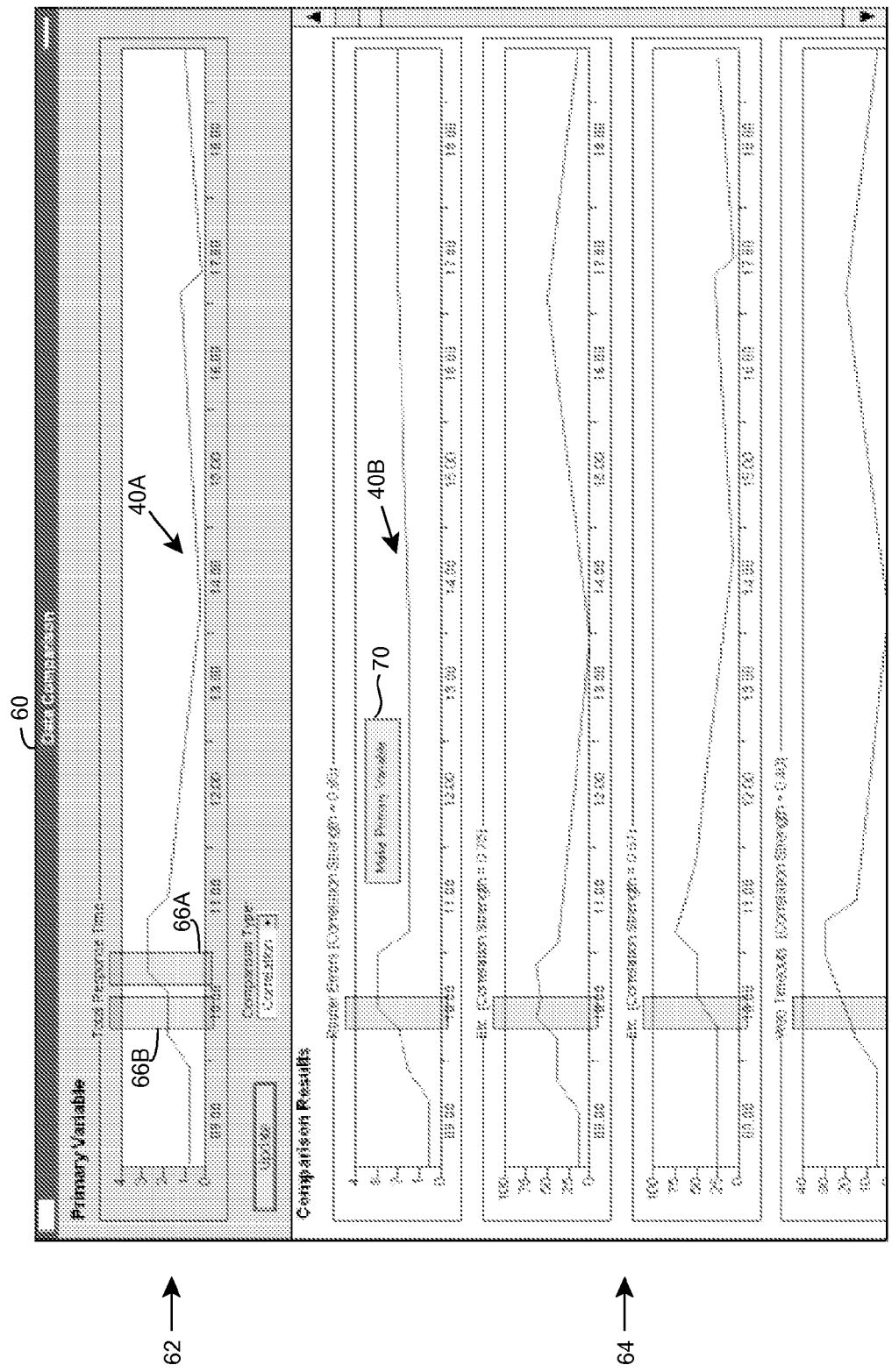
FIGS. 5A-C show the user interface of FIG. 4 with two time period indicators representing two different time periods according to embodiments.

Aspects of the invention enable user 12 to define two different time periods for use by computer system 20 in the comparison. To this extent, in process P3, computer system 20 can obtain definitions for the first and second time periods using any solution. Each time period can include at least two of: a defined start time, a defined stop time, or a duration. The start/stop time(s) for each time period can comprise a fixed moment in time, and not a relative time. For example, FIG. 5A shows user interface 60 with two time period indicators 66A-B representing two different time periods according to an embodiment. User interface 60 can enable user 12 to define each time period 66A-B using any solution. Further, the durations of the first and second time periods 66A-B can be correlated. To this extent, computer system 20 can enable user 12 to select a corresponding type of correlation between the two time periods 66A-B. In this case, when user 12 adjusts the duration of one time period longer/shorter, computer system 20 can automatically adjust the duration of the other time period to maintain the same ratio between the time period lengths. By default, computer system 20 can utilize a ratio of one-to-one for the time period durations. However, computer system 20 can enable user 12 to define an alternative horizontal ratio (e.g., 1.5:1, 0.5:1, and/or the like) using any solution. In this case, a high correlation between data sequences 40A-B can be found when the corresponding data are elongated/compressed versions of one another. User 12 can define a vertical ratio in a similar manner. Further, computer system 20 can normalize the respective values in each data sequence 40A-B to have a designated/default vertical ratio.

In any event, in process P4, computer system 20 can compare the data for the first time period 66A in primary data sequence 40A with data for the second time period 66B in each of the set of secondary data sequences 40B. Computer system 20 can assign a sequence ranking 42 to each secondary data sequence 40B based on the comparison using any solution. For example, a secondary data sequence 40B having data in the second time period 66B that, when compared using the selected type(s) of comparison and/or ratio(s), is similar to data in the first time period 66A for the primary data sequence 40A, can be assigned a high sequence ranking 42. To this extent, the data in the first time period 66A for the primary data sequence 40A provides a template for the comparison of data in the secondary data sequence(s) 40B for the second time period 66B.

In process P5, computer system 20 can display one or more secondary data sequences 40B based on the comparing. For example, computer system 20 can select one or more of the data sequences 40B based on the corresponding sequence rankings 42 (e.g., the highest three, all having rankings greater than a designated minimum, and/or the like), and can include a graphical representation of the same portion of each selected secondary data sequence 40B as displayed for the primary data sequence 40A. In this manner, user 12 can perform various analysis, such as cause and effect analysis, on the set of secondary data sequences 40B. It is understood that computer system 20 can enable user 12 to request various manipulations of the set of secondary data sequences 40B, which can be implemented by computer system 20. For example, user 12 can request to remove a data sequence, add a data sequence, change the display order of data sequences, and/or the like, using any solution.

Figure 5B:
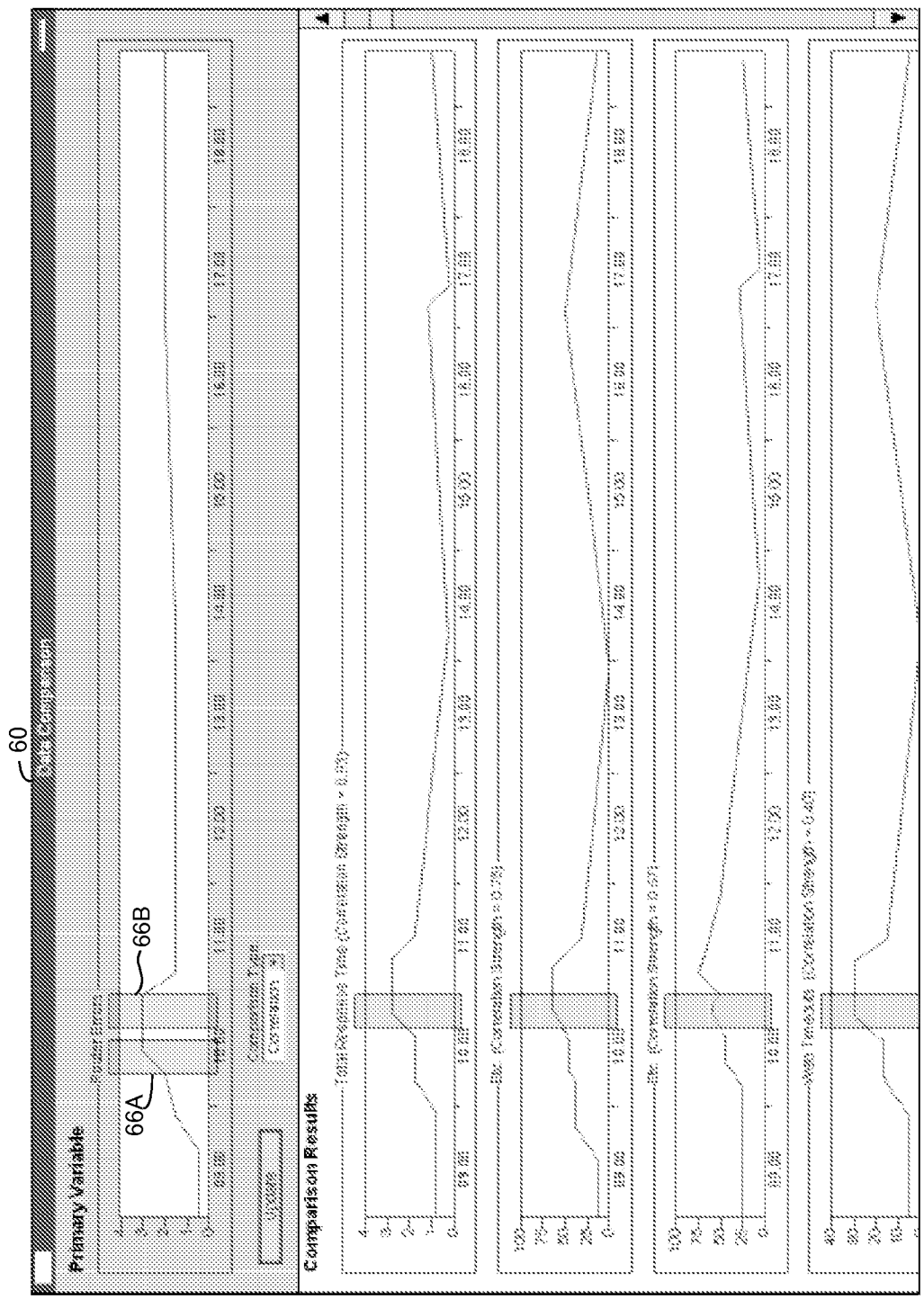
Figure 5C:
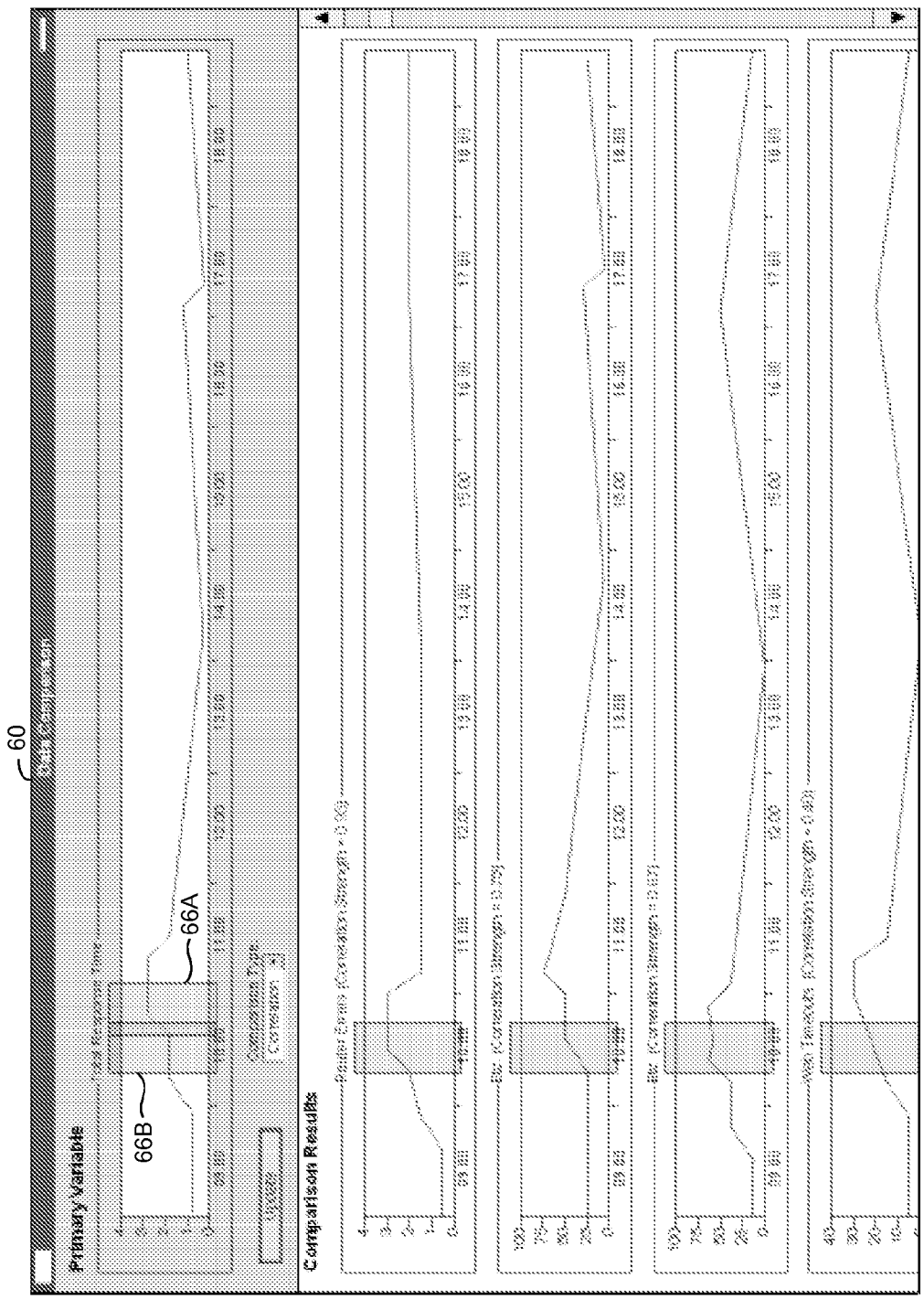

While the second time period 66B is shown preceding first time period 66A, it is understood that time periods 66A-B can be located relative to one another in any manner. For example, FIG. 5B shows user interface 60 in which first time period 66A precedes second time period 66B, and FIG. 5C shows user interface 60 in which first time period 66A and second time period 66B overlap. In this manner, computer system 20 and/or user interface 60 provides user 12 with a highly flexible tool for quickly evaluating possible relationships, such as cause and effect relationships, between various data sequences. Further, while a single pair of time periods 66A-B are shown, it is understood that user 12 can define multiple pairs of time periods for evaluation. For example, when an alarm condition occurs more than once, user 12 can define multiple pairs of time periods for two or more occurrences of the alarm condition. Computer system 20 can assign rankings to each secondary data sequence based on a combination (e.g., an average) of the sequence rankings 42 assigned for each of the pairs of time periods. In this manner, computer system 20 can quickly identify data sequences that show a strong correlation over more than one occurrence of the same event.

It is understood that user interface 60 can enable user 12 to perform various actions that will modify the settings for the comparison. To this extent, in decision D1, computer system 20 can determine that a modification is received, in which case flow can return to process P4. User 12 can perform one or more of any type of modification. For example, user 12 can adjust the location, relative position, length of time, and/or the like for one or both time periods 66A-B. Further, user 12 can request to change the primary data sequence 40A to one of the set of secondary data sequences 40B. In this case, as shown in FIG. 5A, computer system 20 can generate a popup window 70, or the like, in response to a user action, which enables user 12 to make the request. After receiving the change request, computer system 20 can adjust the primary data sequence 40A and/or the set of secondary data sequences 40B. In particular, secondary data sequence 40B can be made the primary data sequence 40A. Further, primary data sequence 40A can be added to the set of secondary data sequences 40B. FIG. 5B shows an illustrative result of processing the change.

After adjusting the primary data sequence 40A, computer system 20 can repeat the comparing, during which the corresponding sequence rankings 42 for each secondary data sequence 40B can be re-assigned. Further, as a result of a new primary data sequence, computer system 20 may automatically add/remove one or more data sequences to/from the set of secondary data sequences (e.g., based on an identification attribute).

Returning to FIG. 1, computer system 20 can comprise a comprehensive monitoring and analysis system, which acquires data for each data sequence 40, enables user 12 to define alarm conditions for the data, generates an alarm for a data sequence 40 based on the acquired data and the alarm condition, and enables user 12 to compare data between multiple data sequences 40 as described herein. To this extent, computer system 20 can generate and further manage each of the user interfaces described herein as well as any additional user interfaces that may be required/desirable. Alternatively, computer system 20 can implement a portion of the monitoring and analysis system. For example, computer system 20 can manage an application program interface (API) that enables another computer system to generate user interfaces, provide data for data sequences, and/or the like. Still further, computer system 20 can comprise an add-on, or the like, which only implements the comparison process using two different time periods as described herein.

Regardless, in each implementation of computer system 20, computer system 20 can write the sequence ranking 42 for each of the set of secondary data sequences to a computer useable medium as a final or intermediate action in implementing a process described herein. For example, computer system 20 can write the sequence ranking(s) to a temporary or permanent data store for use in generating a user interface, storage for later use by another system, communication to another system, and/or the like. Similarly, it is understood that any data generated by computer system 20 will be written by computer system 20 to a computer useable medium in a similar manner.

While shown and described herein as a method and system for comparing data, it is understood that aspects of the invention further provide various alternative embodiments. For example, in one embodiment, the invention provides a computer program stored on at least one computer-readable medium, which when executed, enables a computer system to compare data. To this extent, the computer-readable medium includes program code, such as monitoring program 30 (FIG. 1), which makes a computer system operable to implement some or all of a process described herein. It is understood that the term "computer-readable medium" comprises one or more of any type of tangible medium of expression capable of embodying a copy of the program code (e.g., a physical embodiment).

In another embodiment, the invention provides a method of providing services, which includes managing a computer system for comparing data, such as computer system 20 (FIG. 1). In this case, a service provider can obtain (e.g., create, receive, and/or the like) a specification for the functionality of the computer system. Based on the specification, the service provider can perform one or more management functions at any of various stages of the development and/or maintenance cycles of the computer system. In particular, the service provider can perform one or more of: hardware and/or software design of environment 10 (FIG. 1); configuration/installation of computer system 20 or one or more hardware components thereof; development of monitoring program 30 (FIG. 1) or module(s) thereof; deployment of monitoring program 30 to computer system 20; maintenance of computer system 20 and/or monitoring program 30; hosting computer system 20 for use by customer(s); and/or the like, using any solution. It is understood that during the development and/or maintenance cycles, the functional specification for the computer system may be adjusted and that one or more of the management functions may be performed multiple times by the service provider.

It is understood that aspects of the invention can be implemented as part of a business method that performs a process described herein on a subscription, advertising, and/or fee basis. That is, a service provider could offer to compare data as described herein. In this case, the service provider can manage a computer system, such as computer system 20 (FIG. 1), as described herein. In return, the service provider can receive payment from the customer(s) under a subscription and/or fee agreement, receive payment from the sale of advertising to one or more third parties, and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method comprising:
    comparing, via a computing system, data for a first time period in a primary data sequence with data for a second time period in each of a set of secondary data sequences, wherein the durations of the first and second time periods are correlated, and wherein the first time period is different from the second time period;
    assigning a ranking to each of the set of secondary data sequences based on the comparing;
    writing the ranking for each of the set of secondary data sequences to a computer useable medium;
    adjusting the primary data sequence and the set of secondary data sequences based on a request to change the primary data sequence to one of the set of secondary data sequences; and
    repeating the comparing, assigning, and writing for the adjusted primary data sequence and set of secondary data sequences.

2. The method of claim 1, further comprising managing a user interface, the user interface including a graphical representation of at least a portion of the primary data sequence and enabling a user to graphically define the first time period and second time period using a first period indicator and a second period indicator adjacent to the primary data sequence.

3. The method of claim 2, further comprising:
    selecting at least one of the set of secondary data sequences based on the ranking for each of the set of secondary data sequences; and
    including a graphical representation of at least a portion of the selected at least one of the set of secondary data sequences in the user interface.

4. The method of claim 2, further comprising obtaining an evaluation request that includes an identification of the primary data sequence from a plurality of data sequences, and generating the user interface in response to the evaluation request.

5. The method of claim 4, further comprising:
    obtaining an identification attribute that identifies a set of related data sequences; and
    generating the set of secondary data sequences based on the identification attribute, the set of secondary data sequences and the primary data sequence being a subset of a larger group of data sequences.

6. The method of claim 1, further comprising obtaining a selection of a comparison type from a plurality of comparison types, the comparing using the selected comparison type.

7. The method of claim 1, wherein the first time period and second time period partially overlap.

8. A system comprising:
    a memory; and
    a processor programmed to:
        compare data for a first time period in a primary data sequence with data for a second time period in each of a set of secondary data sequences, wherein the durations of the first and second time periods are correlated, and wherein the first time period is different from the second time period;
        assign a ranking to each of the set of secondary data sequences based on the comparing;
        write the ranking for each of the set of secondary data sequences to the memory;
        adjust the primary data sequence and the set of secondary data sequences based on a request to change the primary data sequence to one of the set of secondary data sequences; and
        repeat the comparing, assigning, and writing for the adjusted primary data sequence and set of secondary data sequences.

9. The system of claim 8, where the processor is further programmed to manage a user interface, the user interface comprising a graphical representation of the primary data sequence and enabling a user to graphically define the first time period and second time period using a first period indicator and a second period indicator adjacent to the primary data sequence.

10. The system of claim 9, where the processor is further programmed to select at least one of the set of secondary data sequences based on the ranking for each of the set of secondary data sequences, wherein the user interface further includes a graphical representation of the selected at least one of the set of secondary data sets.

11. The system of claim 9, where the processor is further programmed to obtain an evaluation request that includes an identification of the primary data sequence from a plurality of data sequences, where in being programmed to manage the user interface, the processor is programmed to generate the user interface in response to the evaluation request.

12. The system of claim 8, where the processor is further programmed to define the primary data sequence and the set of secondary data sequences based on a group of data sequences.

13. The system of claim 8, where the processor is further programmed to:
    acquiring acquire data for each data sequence; and
    generate an alarm for a data sequence based on the acquired data and an alarm condition.

14. A computer program comprising program code stored on a computer-readable storage medium, that makes a computer system operable to implement a method, the method comprising:
    comparing data for a first time period in a primary data sequence with data for a second time period in each of a set of secondary data sequences, wherein the durations of the first and second time periods are correlated, and wherein the first time period is different from the second time period;
    assigning a ranking to each of the set of secondary data sequences based on the comparing;

writing the ranking for each of the set of secondary data sequences to a computer useable medium;

adjusting the primary data sequence and the set of secondary data sequences based on a request to change the primary data sequence to one of the set of secondary data sequences; and repeating the comparing, assigning, and writing for the adjusted primary data sequence and set of secondary data sequences.

15. The computer program of claim 14, the method further comprising managing a user interface, the user interface including a graphical representation of the primary data sequence and enabling a user to graphically define the first time period and second time period using a first period indicator and a second period indicator adjacent to the primary data sequence.

16. The computer program of claim 15, the method further comprising:

selecting at least one of the set of secondary data sequences based on the ranking for each of the set of secondary data sequences; and including a graphical representation of the selected at least one of the set of secondary data sets in the user interface.

17. The computer program of claim 15, the method further comprising obtaining an evaluation request that includes an identification of the primary data sequence from a plurality of data sequences, and generating the user interface in response to the evaluation request.

18. A method of providing services, the method comprising:

managing a computer system operable to:

compare data for a first time period in a primary data sequence with data for a second time period in each of a set of secondary data sequences, wherein the durations of the first and second time periods are correlated, and wherein the first time period is different from the second time period;

assign a ranking to each of the set of secondary data sequences based on the comparing;

write the ranking for each of the set of secondary data sequences to a computer useable medium;

adjust the primary data sequence and the set of secondary data sequences based on a request to change the primary data sequence to one of the set of secondary data sequences; and repeat the comparing, assigning, and writing for the adjusted primary data sequence and set of secondary data sequences.

\* \* \* \* \*